(12) United States Patent
Bengtsson et al.

(10) Patent No.: US 10,699,177 B2
(45) Date of Patent: Jun. 30, 2020

(54) ELECTRONIC TAG

(71) Applicant: SONY MOBILE COMMUNICATIONS INC., Tokyo (JP)

(72) Inventors: Henrik Bengtsson, Lund (SE); Peter Lerup, Limhamn (SE); Pontus Oldberg, Tomelilla (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/488,707

(22) PCT Filed: Mar. 12, 2018

(86) PCT No.: PCT/EP2018/056119
§ 371 (c)(1),
(2) Date: Aug. 26, 2019

(87) PCT Pub. No.: WO2018/162763
PCT Pub. Date: Sep. 13, 2018

(65) Prior Publication Data
US 2020/0034677 A1 Jan. 30, 2020

(30) Foreign Application Priority Data

Mar. 10, 2017 (EP) ..................................... 17160429

(51) Int. Cl.
*H04W 12/00* (2009.01)
*H04B 5/00* (2006.01)
(Continued)

(52) U.S. Cl.
CPC ...... *G06K 19/0723* (2013.01); *A63B 24/0062* (2013.01); *H04B 5/0062* (2013.01);
(Continued)

(58) Field of Classification Search
CPC .............. H04B 5/0025; H04B 1/70735; H04B 5/0056; H04B 5/0062; H04W 4/02;
(Continued)

(56) References Cited

U.S. PATENT DOCUMENTS 6,150,948 A 11/2000 Watkins
6,323,775 B1 11/2001 Hansson
(Continued)

FOREIGN PATENT DOCUMENTS

FR 2898201 A1 9/2007
GB 2530771 A 4/2016
(Continued)

OTHER PUBLICATIONS

International Search Report and Written Opinion from corresponding International Patent Application No. PCT/EP2018/056119 dated Jun. 8, 2018, 13 pages.

(Continued)

*Primary Examiner* — Andrew Wendell
(74) *Attorney, Agent, or Firm* — Tucker Ellis LLP

(57) ABSTRACT

An electronic tag (1) with a Bluetooth (BT) transmitter and a proximity sensor is configured to automatically, when an object (30) enters a detection zone of the proximity sensor, switch from a default sleep mode, in which the BT transmitter is deactivated, to an active mode in which the BT transmitter transmits a data package including an identifier of the electronic tag (1). A data collection system may include system devices (100) provided with a respective electronic tag (1) that stores a unique identifier of the system device (100), and a computer system (50) that receives the identifier from a portable electronic device (30) configured to intercept data packets from electronic tags (1). The system devices (100) may comprise exercise devices, and the data (Continued)

collection system may be a workout system that allows users of the exercise devices to automatically track their workout.

13 Claims, 4 Drawing Sheets

(51) Int. Cl.
G06K 19/07 (2006.01)
H04W 4/80 (2018.01)
A63B 24/00 (2006.01)

(52) U.S. Cl.
CPC ......... *H04W 4/80* (2018.02); *A63B 2220/833* (2013.01); *A63B 2225/52* (2013.01); *A63B 2225/54* (2013.01)

(58) Field of Classification Search
CPC ... H04W 4/00; H04W 12/00407; H04W 4/80; G06K 19/0723; G06K 19/0716; G06K 7/10128; A63B 24/0062; A63B 2225/54; A63B 2225/52; A63B 2220/833
See application file for complete search history.

(56) References Cited

U.S. PATENT DOCUMENTS

| | | | |
|---|---|---|---|
| 9,460,604 B1 | 10/2016 | Daniel | |
| 9,472,075 B1* | 10/2016 | Simon | G08B 13/2462 |
| 2002/0126013 A1 | 9/2002 | Bridgelall | |
| 2003/0104848 A1 | 6/2003 | Brideglall | |
| 2003/0132301 A1 | 7/2003 | Selker | |
| 2007/0171091 A1 | 7/2007 | Nisenboim | |
| 2008/0048880 A1 | 2/2008 | Strickland | |
| 2008/0129486 A1 | 6/2008 | Jeckelmann | |
| 2012/0161963 A1* | 6/2012 | Herrala | G06Q 10/06 340/539.13 |
| 2013/0090212 A1 | 4/2013 | Wang | |
| 2013/0127599 A1 | 5/2013 | Foster | |
| 2014/0220855 A1* | 8/2014 | Heilbron | A63H 13/005 446/175 |
| 2015/0382150 A1 | 12/2015 | Ansermet | |
| 2016/0241999 A1* | 8/2016 | Chin | G08C 23/04 |
| 2016/0325141 A1* | 11/2016 | Wu | G06F 1/1626 |
| 2016/0346617 A1 | 12/2016 | Srugo | |
| 2016/0377457 A1 | 12/2016 | Zhang | |

FOREIGN PATENT DOCUMENTS

| | | |
|---|---|---|
| JP | 2011136131 A | 7/2011 |
| WO | 0237732 A2 | 5/2002 |
| WO | 2007060616 A2 | 5/2007 |
| WO | 2008118173 A1 | 10/2008 |
| WO | 2015113162 A1 | 8/2015 |

OTHER PUBLICATIONS

European Search Report from corresponding European Application No. 17160429.1, dated Sep. 11, 2017, 8 pages.

* cited by examiner

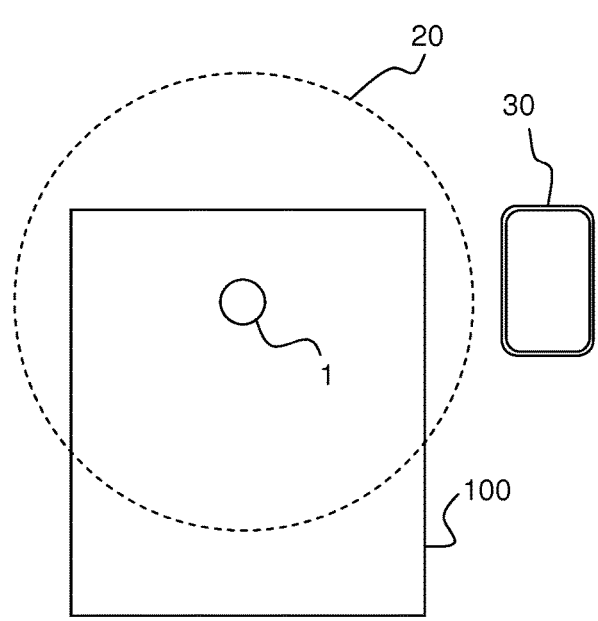
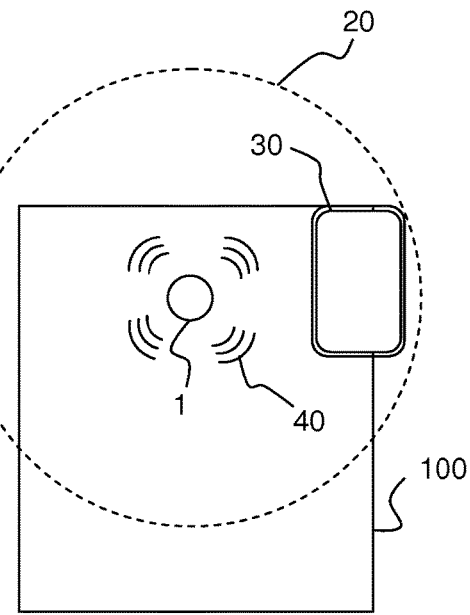
FIG. 1A  FIG. 1B
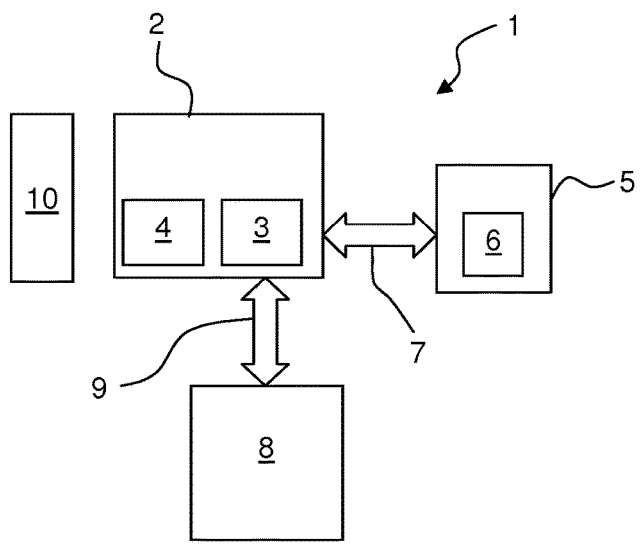
FIG. 2

ELECTRONIC TAG

TECHNICAL FIELD

The present invention relates generally to electronic tags configured for short-range wireless transfer of an identifier to a receiving electronic device, as well as data collection by use of such electronic tags.

BACKGROUND

This type of electronic tag is well-known and may be used for various identification purposes. The electronic tag may be based on Radio-frequency identification (RFID) technology, in which radio waves are used to automatically identify electronic tags attached to objects. Such RFID tags are read by dedicated RFID readers. The RFID reader sends an interrogating signal to the tag, and the tag responds with its unique information. RFID tags may be passive, i.e. non-powered, and collect energy from the interrogating signal of the RFID reader.

A specialized subset within the family of RFID technology is denoted Near-field communication (NFC). Specifically, NFC is a branch of High-Frequency (HF) RFID. NFC is designed to be a secure form of data exchange, and an NFC device is capable of being both an NFC reader and an NFC tag.

It is a general desire to provide electronic tags that are capable of being read by a variety of different electronic devices, including existing and future communication devices such as mobile terminals, smartphones, tablets, wearables, etc. These devices may not include a specialized RFID or NFC reader. One technology that has penetrated into many different types of electronic devices, and is expected to penetrate further by the proliferation of Internet of Things (IoT), is Bluetooth® which is a wireless technology standard for exchanging data over short distances, as well as its low-power variant Bluetooth low energy (BLE).

There are commercially available electronic devices that are based on a communication protocol denoted iBeacon and developed by Apple, Inc. These electronic devices, also known as beacons, use a Bluetooth transmitter to broadcast a universally unique identifier for interception by nearby portable electronic devices. The iBeacon technology enables the portable electronic device to perform actions when in close proximity to a beacon, e.g. to display tailored advertising. The beacon receives power from a power source, which may be a small built-in battery. To ensure low power consumption, and thus a long battery life, the Bluetooth transmitter is typically a BLE transmitter.

SUMMARY

It is an objective of the invention to at least partly overcome one or more limitations of the prior art.

Another objective is to provide an electronic tag based on Bluetooth technology and with low power consumption.

A further objective is to provide a data collection system for collecting data in relation to a plurality of system devices, including devices for physical exercise.

One or more of these objectives, as well as further objectives that may appear from the description below, are at least partly achieved by an electronic tag, a data collection system, a method of operating a portable electronic device, a computer-readable medium, and a portable electronic device according to the independent claims, embodiments thereof being defined by the dependent claims.

A first aspect of the invention is an electronic tag, comprising: a Bluetooth transmitter; a proximity sensor configured to detect presence of an object within a detection zone; and a control unit electrically connected to the proximity sensor and the Bluetooth transmitter. The control unit is configured to selectively, when the proximity sensor detects presence of the object within the detection zone, activate the Bluetooth transmitter to transmit a data package comprising an identifier of the electronic tag.

According to the first aspect, the electronic tag is configured to transmit one or more data packages only when an object is found to be within the detection zone of the proximity sensor. Compared to an electronic tag with a Bluetooth transmitter that consistently, i.e. at all times, transmits data packages for receipt by other electronic devices, the electronic tag of the first aspect has a significantly lower power consumption, by the selective activation of the Bluetooth transmitter. Further, by reducing the average number of data packages that are transmitted over time by the Bluetooth transmitter in the electronic tag, the first aspect provides the additional advantage of preventing numerous data packages from polluting the air in the surroundings of the electronic tag. This may be especially important if many electronic tags are installed in a confined space, such as an office, a store, a gym, etc. A further technical advantage of the first aspect is that, for a given average power consumption and compared to an electronic tag that consistently transmits data packages at a certain rate, it is possible to configure the electronic tag of the first aspect to transmit data packages at a much higher rate when the Bluetooth transmitter is activated. This has the additional advantage of increasing the likelihood that one or more data packages are properly received by a receiving device, especially if the data packages are broadcast by the electronic tag.

Additionally, in some embodiments, the proximity sensor is configured such that the detection zone is less than about 1 m, preferably less than about 0.5 m, and most preferably less than about 0.1 m.

Additionally, in some embodiments, the Bluetooth transmitter is a BLE transmitter.

Additionally, in some embodiments, the control unit is configured to activate the Bluetooth transmitter in a broadcast mode to transmit the data package.

Additionally, in some embodiments, the control unit is configured to activate the Bluetooth transmitter to repeatedly transmit the data package during a preconfigured time period.

Additionally, in some embodiments, the electronic tag further comprises a storage memory which is configured to store the identifier, wherein the control unit is configured, before activating the Bluetooth transmitter, to retrieve the identifier from the storage memory and provide the identifier to the Bluetooth transmitter.

A second aspect of the invention is a data collection system, comprising: a plurality of system devices; an electronic tag of the first aspect and any of its embodiments, which is arranged to be associated with a respective system device among said plurality of system devices, wherein the identifier of the electronic tag is a device identifier which is unique to the associated system device; and a computer system configured to receive the device identifier from a portable electronic device that has intercepted the data package transmitted by the electronic tag and extracted the device identifier from the data package.

Additionally, in some embodiments, the electronic tag is configured and arranged such that the associated system device is located within the range of the Bluetooth transmitter in the electronic tag and all other system devices among the plurality of system devices are located beyond the range of the Bluetooth transmitter.

Additionally, in some embodiments, the plurality of system devices comprises exercise devices.

Additionally, in some embodiments, each exercise device comprises a monitoring system for determining workout data for the exercise device, and a wireless transmitter for transmitting the workout data together with the device identifier that is associated with the exercise device, for receipt by the computer system.

Additionally, in some embodiments, the workout data comprises at least one of a weight being used with the exercise device and a number of repetitions of using of the weight.

Additionally, in some embodiments, at least a subset of the exercise devices are arranged in a common facility, the data collection system further comprising a relay device which is arranged in the common facility and is configured to receive the workout data and the device identifier from the wireless transmitter and transmit the workout data and the device identifier to the computer system.

Additionally, in some embodiments, the computer system is configured to, after receiving the device identifier from the portable electronic device and after receiving the workout data and the device identifier transmitted by the wireless transmitter of the exercise device, transmit information related to the workout data to the portable electronic device or to a feedback device associated with the exercise device.

A third aspect of the invention is a method of operating an portable electronic device. The method comprises receiving a data package from an electronic tag according to the first aspect or any of its embodiments; extracting the identifier of the electronic tag from the data package; and communicating the identifier to a computer system.

Advantageously, the method may be used for identifying an exercise device among a plurality of exercise devices, e.g. to a system that collects workout data representative of the use of the exercise device during a workout session by a user.

Additionally, in some embodiments, the method further comprises: obtaining inertial data from an inertial sensor in the portable electronic device; detecting, based on the inertial data, a predefined docking state on the electronic portable device in relation to the electronic tag; wherein said communicating the identifier is enabled only upon detection of the predefined docking state.

Additionally, in some embodiments, the predefined docking state corresponds to the portable electronic device being brought into contact with the electronic tag.

Additionally, in some embodiments, the method further comprises: determining motion of the portable electronic device based on the inertial data, wherein said detecting the predefined docking state comprises detecting that the motion represents an impact of the portable electronic device onto the electronic tag.

Additionally, in some embodiments, the method further comprises: determining a current orientation of the portable electronic device based on the inertial data, wherein said detecting the predefined docking state comprises detecting that the current orientation matches a predefined orientation.

Additionally, in some embodiments, the predefined orientation represents a reference plane of the electronic tag, said reference plane being defined in relation to the direction of gravity.

A fourth aspect of the invention is a computer-readable medium comprising computer instructions which, when executed by a processor, cause the processor to perform the method of the third aspect or any of its embodiments.

A fifth aspect of the invention is a portable electronic device, which is configured to: receive a data package from an electronic tag according the first aspect or any of its embodiments; extract the identifier of the electronic tag from the data package; and communicate the identifier to a computer system.

Additionally, in some embodiments, the portable electronic device is configured to process inertial data from an inertial sensor in the portable electronic device to detect a predefined docking state of the portable electronic device in relation to the electronic tag, and enable the device identifier to be communicated to the computer system only when the predefined docking state is detected.

Additionally, in some embodiments, the predefined docking state corresponds to the portable electronic device being brought into contact with the electronic tag. Additionally, in some embodiments, the portable electronic device is configured to determine its motion based on the inertial data, wherein detecting the predefined docking state comprises detecting that the motion represents an impact of the portable electronic device onto the electronic tag.

Additionally, in some embodiments, the portable electronic device is configured to determine its current orientation based on the inertial data, wherein detecting the predefined docking state comprises detecting that the current orientation matches a predefined orientation.

Additionally, in some embodiments, the predefined orientation represents a reference plane of the electronic tag, said reference plane being defined in relation to the direction of gravity.

It may be noted that all of the foregoing aspects and embodiments may be equally applicable to an electronic tag that comprises, instead of or in addition to the Bluetooth transmitter, another type of transmitter for wireless short-range communication including but not limited to communication in accordance with NFC, Zigbee, Z-wave, RFID, etc. Thus, any reference herein to a Bluetooth (BT) transmitter or BLE transmitter may be replaced by the generic term "short-range wireless transmitter". For example, the foregoing second to fifth aspects and the associated embodiments may include or utilize an electronic tag that is configured to detect an object in proximity of the electronic tag, and, upon detection of the object, transmit a data package comprising an identifier of the electronic tag.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 1A-1B illustrates an electronic BT tag when a communication device is out of range and within range of a proximity sensor in the electronic BT tag.

FIG. 2 is a block diagram of an electronic BT tag.

DETAILED DESCRIPTION OF EXAMPLE EMBODIMENTS

Figure 3:
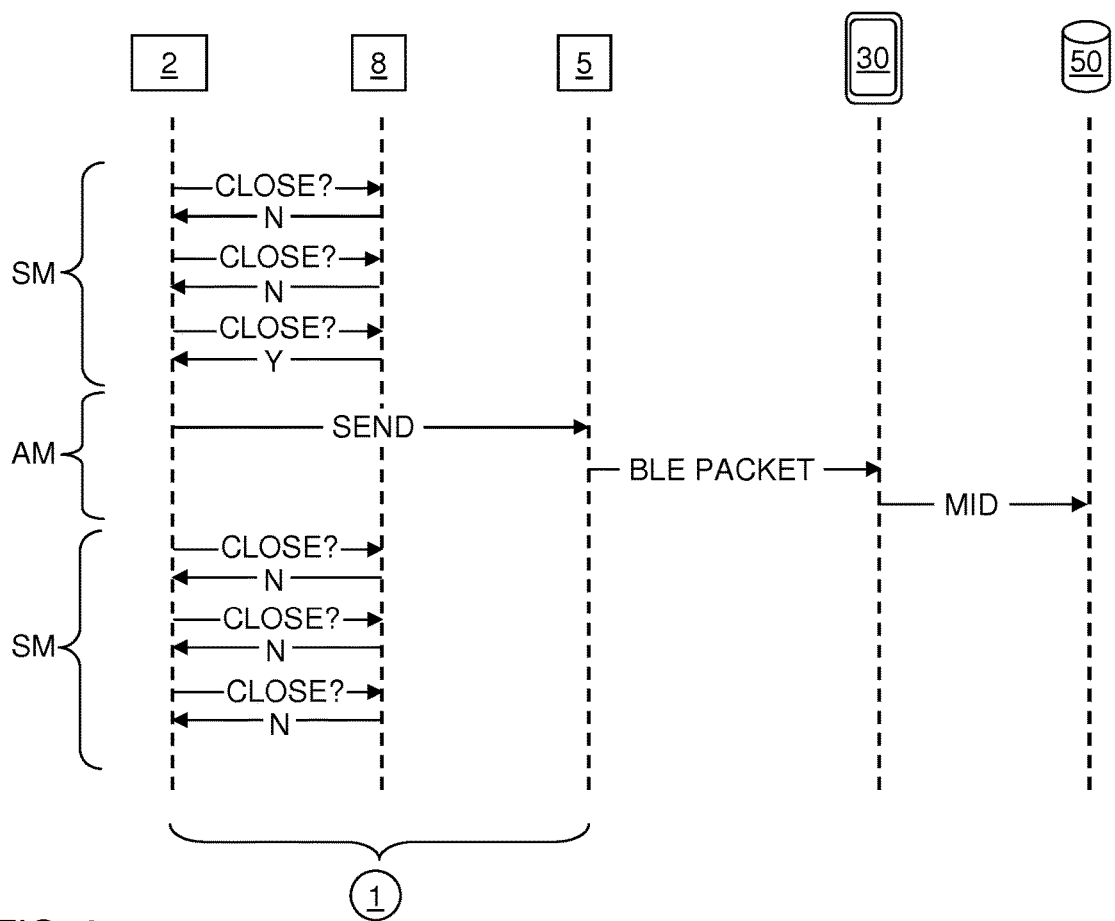
FIG. 3 is sequence diagram for the operation of an electronic BT tag.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

As used herein, a "Bluetooth transmitter" or "BT transmitter" refers to any wireless radio device capable of transmitting data in compliance with a Bluetooth SIG standard in any version. Thus, the term "transmitter" also encompasses transceivers. One specific type of BT transmitter is a BLE transmitter, which is configured to operate according to the Bluetooth Low Energy standard. Bluetooth Low Energy is also known as Bluetooth LE and Bluetooth Smart.

As used herein, a "portable electronic device" or "PED" refers to any electronic device which is capable of being carried, held or worn by a user and comprises a radio device for receiving or intercepting Bluetooth data transmissions. Such portable electronic devices include handheld devices, such as mobile phones, smartphones, tablets, laptops, etc, as well as wearable computers ("wearables"), such as smart glasses, smart watches, badges, bracelets, fitness trackers, etc. The portable electronic devices may be generic devices capable of performing different tasks, e.g. by executing different application programs, or specialized devices tailored to perform a single specific task.

As used herein, a "proximity sensor" refers to any device capable of detecting presence of an object within a certain distance, without requiring physical contact with the object. As used herein, a region in which the proximity sensor is capable of detecting presence of objects is denoted "detection zone". The proximity sensor may implement any conceivable technique for detecting the object, e.g. by emitting a beam or field of electromagnetic radiation (including infrared radiation) or sound waves (including ultrasound) and analyzing the field or a return signal. The proximity sensor may be configured to detect all objects within the detection zone (indiscriminate detection), or only objects having a specific property (discriminate detection). Preferably, the proximity sensor is selected to have low power consumption. Other selection criteria may include low price, robustness, reliability and simplicity of use. It may also be preferable for the proximity sensor not to use RF signals, so as to minimize the risk for RF pollution by the proximity sensor.

As used herein, an "electronic tag" refers to any device capable of being attached to another device and containing electronic circuitry for wireless transmission of data.

Embodiments of the invention relate to an electronic tag with a Bluetooth (BT) transmitter, denoted "BT tag" in the following. In accordance with some embodiments, the BT tag is operable in a default sleep mode, in which the BT transmitter is disabled and thus power consumption is minimal, and is selectively switchable to operate in an active mode, in which the BT transmitter is operated to wirelessly transmit one or more data packages comprising an identifier of the BT tag. In accordance with some embodiments, the BT tag is configured to automatically switch from the sleep mode to the active mode when an object comes within a detection zone of the BT tag. In accordance with some embodiments, the BT tag comprises a proximity sensor configured to define the detection zone and detect presence of the object within the detection zone.

FIGS. 1A-1B illustrate the operation of an electronic BT tag 1 in accordance with an embodiment of the invention. The BT tag 1 is attached to a device 100 and stores an identifier. The BT tag 1 is configured to sense for presence of objects within a detection zone 20 around the BT tag 1. As long as there are no objects within the detection zone 20, as shown in FIG. 1A, the BT tag 1 remains inactive in the sense that it does not generate any BT transmission. When an object enters the detection zone 20, as shown in FIG. 1B, the BT tag 1 automatically activates its BT transmitter to transmit a wireless signal 40 containing the identifier. Thereby, the wireless signal 40 may be received by a portable electronic device, PED, that is located within the signal range of the BT transmitter. The range of the BT transmitter may be selected to be approximately equal to the detection zone 20 or may extend beyond the detection zone 20. In various embodiments, the range of the BT transmitter may be less than 10 m, less than 5 m, less than 2 m, and less than 1 m. The object that enters the detection zone 20 and thereby activates the BT tag 1 may be the PED 30 that subsequently receives the wireless signal 40, as shown in FIG. 1B. However, it is also possible that another object, such as the hand of a user, enters the zone to activate the BT tag 1 to allow a PED 30 located within the range of the BT transmitter to receive the wireless signal 40.

In one embodiment, the BT tag 1 is configured with a small detection zone 20, e.g. extending to a distance of 1-10 cm from the BT tag 1. Such an embodiment may be particularly suitable in situations when it is desirable to have a user perform a deliberate "docking operation" to initiate transfer of the identifier to the PED 30. In such a docking operation, the user actively brings the PED 30, or another object, close to the BT tag 1 on the device 100, or even in contact with the BT tag 1. A small detection zone 20 may also be preferable to reduce the risk of the BT tag 1 being inadvertently activated to transmit the wireless signal 40.

In another embodiment, a larger detection zone 20 may be used, e.g. extending to a distance of 0.5-1 m from the BT tag 1, or even longer. In such an embodiment, the BT tag 1 may be activated without a deliberate action by the user, and possibly even without the user being aware of the need to move the PED 30, or another object, within the detection zone 20 to activate the BT tag 1.

FIG. 2 is a schematic block view of an embodiment of the BT tag 1. The components illustrated in FIG. 2 are located in a housing which is omitted for clarity of presentation. In the illustrated example, the BT tag 1 includes a control unit 2, which is configured to control the operation of the BT tag 1. The control unit 2 comprises a combination of a processor 3 and a memory 4. The memory 4 may store program instructions for execution by the processor 3 for implementing the operation of the control unit 2. The program instructions may be supplied to the processor 3 on a computer-readable medium, which may be a tangible (non-transitory) product (e.g. magnetic medium, optical disk, read-only memory, flash memory, etc) or a propagating signal. The processor 3 may be a generic processor, e.g. a microprocessor, microcontroller, CPU, DSP (digital signal processor), GPU (graphics processing unit), etc, or a specialized processor, such as an ASIC (application specific integrated circuit) or an FPGA (field programmable gate array), or any combination thereof. The memory 4 may include volatile and/or non-volatile memory such as read only memory (ROM), random access memory (RAM) or flash memory. The memory 4 may also store the identifier of the BT tag 1.

The BT tag 1 further comprises a Bluetooth (BT) module or chip 5, which includes a BT transmitter 6. The BT module 5 may, but need not, include a BT receiver (not shown). The BT module 5 is electrically connected for data communication with the control unit 2 through dedicated wiring 7. In one embodiment, the BT module 5 is configured for BLE. A BT module 5 configured for BLE has the general advantage of a significantly lower power consumption, faster connectivity and lower price compared to BT modules configured in accordance with ordinary high-power Bluetooth standards (Classic BT). In the following, it is assumed that the BT module 5 is configured for BLE. The BT module 5 and its transmitter 6 are therefore denoted "BLE module" and "BLE transmitter", respectively.

The BT tag 1 further comprises a proximity sensor 8 that defines the detection zone 20. The proximity sensor 8 is electrically connected for data communication with the control unit 2 through dedicated wiring 9.

The BT tag 1 further comprises a power source 10, typically a battery, for supplying power to the control unit 2, the BLE module 5 and the proximity sensor 8.

FIG. 3 is a sequence diagram illustrating the operation of a system comprising the BT tag 1, a PED 30 and a remote computer system 50, e.g. a server. The BT tag 1 is in a sleep mode SM by default. In the sleep mode SM, the BLE module 5 is disabled so as to not transmit (or receive) wireless signals. The BLE module 5 typically implements one or more low-power modes, and the BLE module 5 may be set in any such low-power mode during the sleep mode SM. As shown in FIG. 3, the control unit 2 intermittently checks if the proximity sensor 8 indicates presence of an object in the detection zone 20. The control unit 2 may e.g. sample the output of the proximity sensor 8 at a rate of 1-10 times per second. By use of a low-power proximity sensor 8, a low-power mode of the BLE module 5, and proper design of the control unit 2, it is possible to limit the power consumption in the sleep mode to less than 50-100 µA, and possibly lower than 10 µA. When the control unit 2 finds that the proximity sensor 8 detects presence of an object within the detection zone 40, the control unit 2 switches the BT tag 1 to an active mode AM and wakes up the BLE module 5 from its low-power mode. As shown in FIG. 3, the control unit 2 commands the BLE module 5 to transmit, by the BLE transmitter 6, a data package (denoted "BLE packet" in the following) containing the identifier. For example, the control unit 2 may retrieve the identifier from the memory 4 and provide the identifier to the BLE module 5 for transmission. The BLE module 5 is preferably controlled to repeatedly transmit the BLE packet during a preconfigured time period, e.g. 0.1-2 seconds, at a preconfigured interval, e.g. 10-100 ms, thereby providing a confined burst of BLE packets. For reason of power efficiency and data transfer time, the BLE module 5 is preferably controlled to broadcast the BLE packets, by operating the BLE module 5 in the so-called advertising mode. After the preconfigured time period, the control unit 2 returns the BT tag 1 to the sleep mode SM.

In the example of FIG. 3, a PED 30 is located within the range of the BLE module 5. The PED 30 comprises a BT module (not shown) which a BT receiver or BT transceiver capable of intercepting BLE packets. Thereby, the PED 30 intercepts one or more of the BLE packets that are broadcast by the BT tag 1 in the active mode AM. The PED 30 may run an application program that receives the BLE packet(s) and extracts the identifier. The application program may then, optionally after performing one or more actions triggered by the BLE packet, transfer the identifier, designated by MID in FIG. 3, to the remote computer system 50 over any suitable communication channel, optionally together with additional data included in the BLE packet, generated by the application program or entered by the user into the PED 30.

Figures 4, 5:
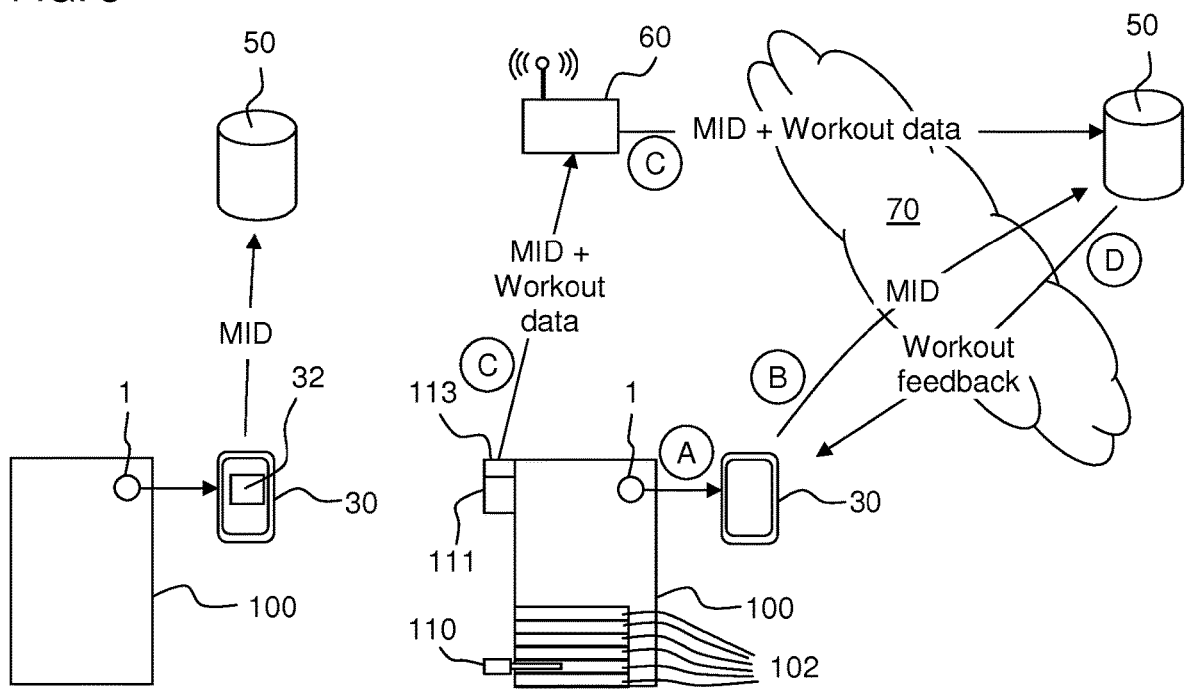
FIG. 4 illustrates a data flow in a data collection system involving electronic BT tags.
FIG. 5 illustrates data flow in a data collection system involving exercise devices with electronic BT tags.

FIG. 4 illustrates a data collection system comprising a plurality of system devices 100 (one shown) provided with a respective BT tag 1, a plurality of PEDs 30 (one shown) and a remote computer system 50. Each BT tag 1 in the system stores a unique identifier, MID. The remote computer system 50 stores a database that associates the MID of the respective BT tag 1 with the device 100 to which it is attached.

The user of the PED 30 may start a data collection session by actively bringing the PED 30 close to the BT tag 1, thereby "docking" the PED 30 to the BT tag 1 and causing the BT tag 1 to enter the active mode AM and transmit BLE packets. The PED 30 intercepts one or more of the BLE packets. Depending on implementation, a dedicated application program may already be running on the PED 30 when the PED 30 is docked to the BT tag 1, or the PED 30 may automatically start the application program upon receipt of the BLE packet, or the PED 30 may, via a user interface 32, request the user to start the application program. Irrespective of implementation, the user may receive a confirmation of a successful docking via the user interface 32. The application program will receive the data included in the BLE packet, including the MID, and then transfer the MID from the PED 30 to the remote computer system 50, optionally together with additional information, e.g. other data included in the BLE packet, data generated or retrieved by the application program (e.g. information about the user), data entered by the user via the user interface 32, or data otherwise generated by means of the PED 30, e.g. image(s), audio, video. Based on the transmitted MID, the remote computer system 50 is able to identify the particular device 100 and store relevant data in association with the device 100 and/or take dedicated action.

Figure 7A:
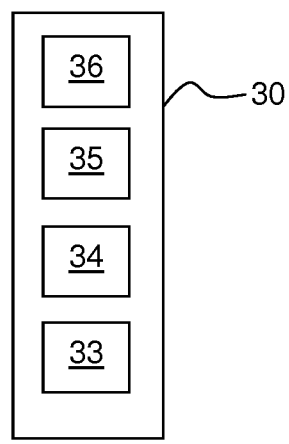
FIG. 7A is a block diagram of an exemplifying communication device.

FIG. 7A is a schematic view of an example PED 30 for use in embodiments of invention. In the illustrated example, the PED 30 comprises a processor 33, a memory 34, a communication system 35 and an inertial sensor 36. The memory 34 may store program instructions for execution by the processor 33 for implementing the operation of the PED 30. The program instructions may be supplied to the processor 33 on a computer-readable medium, which may be a tangible (non-transitory) product (e.g. magnetic medium, optical disk, read-only memory, flash memory, etc) or a propagating signal. For implementation examples of processor 33 and memory 34, refer to the foregoing description of the BT tag 1. The communication system 35 may comprise one or more modules and is configured to receive BT signals, including data packages from tags 1, and to communicate with the remote computer system 50 on any suitable communication channel. Depending on implementation, the inertial sensor 36 may comprise one or more acceleration sensors and/or one or more gyroscopes.

Reverting to FIG. 1B, a problem may occur when two or more PEDs 30 are located within the range of the BT transmitter 6 and only one PED 20 is intended to respond to the BLE packet transmitted by the BT tag 1 by transferring the MID and any additional data to the remote computer system 50. This "competition problem" may be ameliorated by configuring and arranging the respective BT tag 1 such that only its associated system device 100 is located within range of the BT transmitter 6 of the BT tag 1. This will reduce the risk of unintentional interception of data packages from BT tags 1.

Figure 7B:
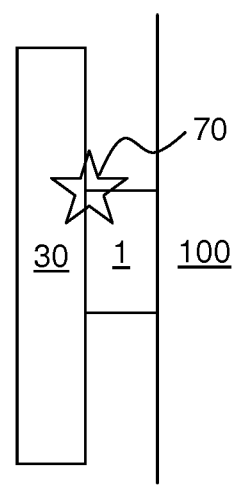
FIGS. 7B-7C illustrate embodiments of detecting a docking of the communication device to an electronic tag.
Figure 7C:
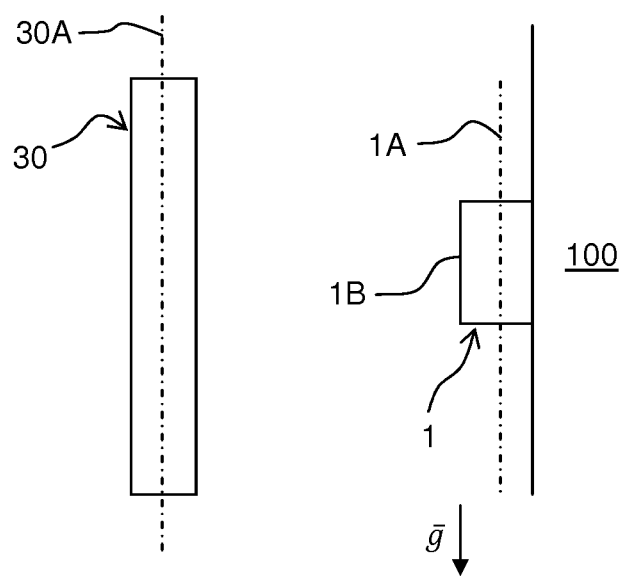

FIGS. 7B-7C illustrate two embodiments of a docking confirmation operation that provide an alternative or complementary technique for overcoming the competition problem. In these embodiments, a PED 30 will not communicate the MID to the remote computer system 50 until the PED 30 has detected a predefined docking state or condition in relation to the tag 1, given by the motion and/or the orientation of the PED 30.

In the embodiment of FIG. 7B, the PED 30 is configured to respond to the BLE packet only if a specific impact 70 is detected in the motion of the PED 30, based on inertial data from the inertial sensor 36, e.g. one or more accelerometers. Preferably, the PED 30 implements a timeout, by requiring the impact 70 to be detected within a predefined time period from the time point when the BLE packet is first received by the PED 30. As shown, the impact signal 70 is generated by the user of the PED 30 bringing the PED 30 into contact with the BT tag 1, thereby engagingly docking the PED 30 to the BT tag 1. Thus, among two competing PEDs 30, only the PED 30 that is brought into physical contact with the BT tag 1 will respond to the BLE packet by transmitting the MID to the remote computer system (FIG. 4).

In the embodiment of FIG. 7C, the PED 30 is configured to respond to the BLE packet only if the PED 30 is properly oriented with respect to the tag 1. Specifically, the PED 30 is configured to respond to the BLE packet only if the orientation of a reference plane 30A of the PED 30, as given by inertial data from the inertial sensor 36, e.g. one or more gyroscopes, has or attains a predefined orientation. For example, in the predefined orientation, the reference plane 30A may be parallel to a reference plane 1A of the tag 1. Preferably, the PED 30 requires the predefined orientation to be attained within a predefined time period from the time point when the BLE packet is first received by the PED 30. This embodiment presumes that the reference plane 1A of the respective tag 1 is known to the PED 30. The reference planes 1A of the tags 1, and the orientation of the reference plane 30A, are preferably defined in relation to the direction of gravity $\bar{g}$. In one example, all tags 1 have the same orientation of their reference plane 1A. In another example, the PED 30 stores reference data, e.g. a look-up table, that associates MIDs with reference planes 1A, thereby allowing the PED 30 to determine the reference plane 1A for a tag 1 based on the MID in the incoming BLE packet. The reference plane 1A of the tag 1 may co-extend with a front surface 1B of the tag 1 facing the user, and the reference plane 30A of the PED 30 may co-extend with a front or rear surface of the PED 30. Thereby, a user may perform a docking of the PED 30 by aligning the front or rear surface of the PED 30 with the front surface 1B of the tag 1.

To avoid incidental detection of a docking operation, the PED 30 may implement a combination of the embodiments in FIGS. 7B-7C. Thus, the PED 10 may require detection of both the specific impact 70 and a predefined orientation of the PED 30 in order to respond to an incoming BLE packet, where the predefined orientation is preferably inherent to bringing the PED 30 into physical contact with the tag 1. Thereby, the PED 30 implements two different techniques for detecting the physical contact and responds to the BLE packet only if both techniques indicate physical contact.

The data collection system in FIG. 4 may be used for any conceivable purpose that involves data collection at a remote (or local) computer system 50. In one example, the system may be implemented for collection of the status of machines installed in one or a plurality of facilities. In one non-limiting example, the machines are automatic coffee machines installed in one or more offices. If a user experiences a malfunction or otherwise identifies a need for service, the user may dock a PED 30, e.g. a mobile phone, to a BT tag 1 on the coffee machine, causing the PED 30 to receive the BLE packet from the BT tag 1, whereupon an application program in the PED 30 prompts the user to provide feedback, e.g. by providing a written description of the malfunction or requested service and/or by attaching a photograph. When the user has completed the feedback, the application program transmits the MID together with the feedback to the remote computer system 50.

A similar system may be used for collecting information about need for service or maintenance in respect of electronic office equipment such as printers, copiers, scanners, etc.

In an alternative embodiment of the generic system in FIG. 4, the PED 30 is configured to respond to the BLE package by storing the incoming MID, and any additional information, in internal memory 34 (FIG. 7A). The PED 30 may then transfer this data to the remote computer system 50 at a later time, or to a local computer system. If the PED 30 implements the above-described docking confirmation operation, the PED 30 will not store the MID in internal memory 34 for subsequent transfer until the PED 30 has detected the predefined docking state in relation to the tag 1.

FIG. 5 is a schematic overview of the data collection system of FIG. 4 as applied to a gym environment including plurality of exercise devices 100 (one shown), forming a workout system that allows users of gym equipment to automatically track their workouts, as well as possibly receive real-time feedback and assistance to their workouts. Each exercise device 100 is provided with a BT tag 1 as described in the foregoing. The workout system is not limited to any specific exercise devices 100 and may be used to track the weight used and the number of repetitions performed on a variety of weight lifting equipment, including both selectable weight lifting equipment, e.g. as indicated in FIG. 5, in which a user inserts a pin 110 into the equipment to select a number of weight plates 102 to be used, as well as individual fixed weights, e.g. dumbbells and barbells, and removable weight lifting equipment, in which the user add or removes weight plates from a bar to obtain the desired amount of weight.

As depicted in FIG. 5, each exercise device 100 includes a monitoring system 111, which is configured to determine workout data representative of the use of the exercise device during a workout session, including the weight being used and/or number of repetitions of using the weight. The workout data may also include the duration of each repetition and/or the duration of forward movement and reverse movement during the respective repetition. The monitoring system 111 may determine this information by any suitable technique or combination of techniques, including, but not limited to, accelerometers, gyroscopes, ranging sensors that determine distance by emitting a pulses of radiation or sound, etc. Such monitoring systems 111 are well-known in the art, e.g. JP2011136131, WO02/37732, WO2007/060616, WO2008/118173, US2013/0090212 and WO2015/113162.

Each exercise device 100 further comprises a communication unit 113 which stores the same identifier, MID, as the BT tag 1 and is arranged to receive the workout data from the monitoring system 111. The communication unit 113 is configured to communicate the workout data together with the MID to a back-end system 50, e.g. a server or a network account held by the user. Within a facility, e.g. a gym, and if the back-end system 50 is located remotely from the facility, the communication unit 113 may (but need not) be configured to communicate the data to a gateway 60, which is located in the facility and configured to forward the workout data and the MID to the back-end system 50, e.g. over the internet 70. The communication unit 113 may be connected wirelessly or by wire (not shown) to the gateway 60. The communication unit 113 may employ any wireless communication technique for transmitting the data to the gateway 60, including Wi-Fi and Bluetooth. In one embodiment, which enables low-power communication, the communication unit 113 comprises a BLE transmitter or transceiver (not shown) which is paired with a Bluetooth receiver or transceiver (not shown) at the gateway 60.

The workout system may be used in the following way. When a user arrives at an exercise device 100, the BT tag 1 is automatically activated to broadcast BLE packets, which are intercepted by the user's PED 30, e.g. a mobile phone that runs a dedicated application program (step A in FIG. 5). In a gym environment, it is not uncommon that exercise devices 100 are placed close to each other and that the gym space is crowded with people. Thus, the above-mentioned competition problem is likely to occur. This risk may be partly overcome by configuring and arranging the respective BT tag 1 such that only its associated exercise device 100 is located within the range of the BT transmitter 6 of the BT tag 1. Alternatively or additionally, the PED 30 may implement a docking confirmation operation as described above. When the PED 30 has received the BLE packet, and optionally has confirmed that the PED 30 is properly docked to the tag 1, the PED 30 communicates the MID to the back-end system 50, e.g. over the internet 70, together with a unique identifier of the user (step B in FIG. 5). The user then performs a workout session at the exercise device 100, during which the monitoring system 111 determines the workout data, which is communicated along with the MID by the communication unit 113 via the gateway 60 to the back-end system 50 (step C in FIG. 5). The workout data and the MID may be communicated when the user has completed the workout session, but is preferably communicated in real-time. The back-end system 50 may store the workout data in association with the MID (or the corresponding exercise device 100) and the user identifier (or the corresponding user). Further, as indicated by step D in FIG. 5, the back-end system 50 may transmit workout feedback to the PED 30, or to a dedicated feedback device on the exercise device 100 (cf. 117 in FIG. 6A). The workout feedback may be transmitted in real-time and include at least part of the workout data. For example, the feedback may involve presenting the weight and/or repetitions to the user in real-time.

In an alternative embodiment, not shown, the functionality of the back-end system 50 is included in the PED 30 and the communication unit 113 is configured to communicate the workout data and the MID to the PED 30. In such an embodiment, the gateway 60 may be omitted.

Figure 6A:
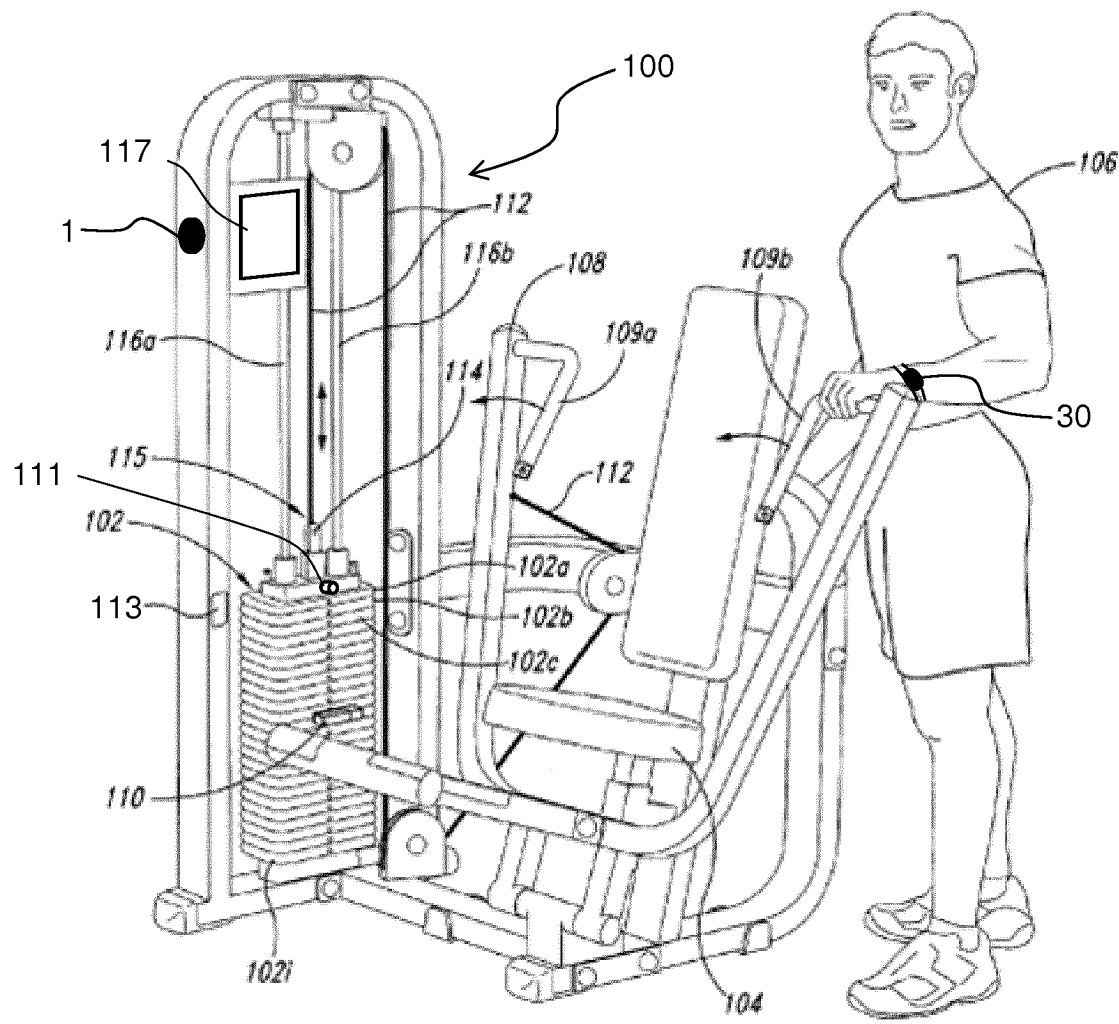
FIGS. 6A-6B show examples of exercise devices.
Figure 6B:
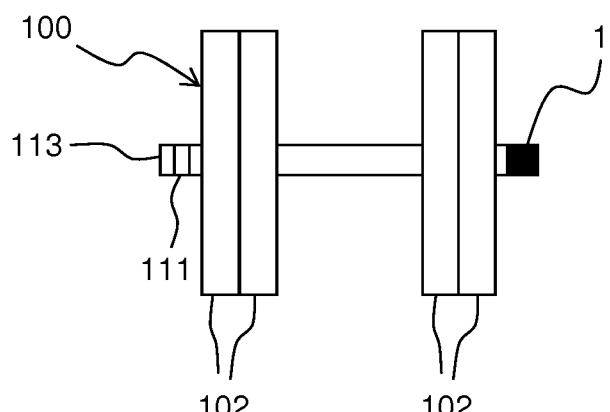

FIGS. 6A-6B show non-limiting examples of exercise devices 100 that may be included in the workout system described in the foregoing. FIG. 6A is an isometric view a conventional stacked weight exercise machine 100 having a plurality of weights 102 (identified individually as weights 102a-102i) and further comprising a monitoring unit 111 for receiving, determining and/or recording workout data related to use of the exercise machine 100, a BT tag 1 and a communication unit 113. A lifting mechanism of the exercise machine may include a weight support member 114, movably suspended from a cable 112 and hanging downward through the weight stack 102. The support member 114 includes a plurality of through-holes positioned adjacent to corresponding weights 102 when the support member 114 is in the relaxed or lowered position shown in FIG. 6A. The cable 112 attaches the support member 114 to a movable exercise bar 108 via a system of pulleys. The amount of weight to lift in operation of the exercise machine is selectively set by means of an engaging member 110, e.g. a weight pin, which is configured to be inserted through a hole or slot in or beneath the desired weight 102. The user 106 pushes the weight pin 110 through the slot until it passes through the adjacent hole in the support member 114. The user 106 then sits on a seat 104 and grasps a right handle 109a and a left handle 109b on the exercise bar 108. As the user 106 presses the bar 108 forward it rotates, pulling on the cable 112 and drawing the support member 114 upwardly. As the support member 114 moves upwardly, the weight pin 110 moves all of the weights 102 stacked above the weight pin 110 upwardly. Various types of exercise machines may comprise parallel guide members 116a and 116b, along which the lifted weights are configured to slide. When the user 106 relaxes his arms and allows his hands to move back toward his chest, the lifted weights 102 return downwardly to the stack. It should be emphasized that the exercise machine of FIG. 6A is merely an example. Other types of exercise machines may be configured to be operated by a standing or lying user, and may be designed such that the lifting mechanism is operated by a pushing, pulling or rotating motion carried out by the user.

It may also noted in FIG. 6A that the PED 30 is configured as a wearable, in this example to be worn on the wrist or arm of the user. For example, the PED 30 may be a smart watch, a fitness tracker, or a dedicated bracelet configured for communication with the back-end system 50. It may also be noted that the machine 100 is provided with a feedback device 117, which may include one or more of a display (as shown) and a speaker. In one embodiment, the workout feedback is transmitted to the feedback device 117 for presentation to the user. Depending on the presentation hardware of the PED 30, the workout feedback may also be transmitted to the PED 30.

FIG. 6B is a side view of an exercise device 100 in the form of a dumbbell or barbell having a number of weight plates 102, a BT tag 1, a monitoring system 111, and a communication unit 113. The monitoring system 111 is configured to at least determine the number of repetitions of the user lifting the exercise device 100. The weight of the exercise device 100 may be fixed and known to the back-end system 50. Alternatively, if the weight may be varied by the user changing the weight plates 102, the monitoring system 111 may be configured to determine the weight of the exercise device 100.

The invention claimed is:

1. A data collection system, comprising:
a plurality of system devices comprising exercise devices, wherein each exercise device comprises a monitoring system for determining workout data for the exercise device, and a wireless transmitter for transmitting the workout data together with a device identifier that is associated with the exercise device, wherein at least a subset of the exercise devices are arranged in a common facility,
an electronic tag comprising:
a wireless short-range transmitter,
a proximity sensor configured to detect presence of an object within a detection zone, and
a control unit electrically connected to the proximity sensor and the wireless short-range transmitter,
wherein the control unit is configured to selectively, when the proximity sensor detects presence of the object within the detection zone, activate the wireless short-range transmitter to transmit a data package comprising an identifier of the electronic tag,
wherein the electronic tag is arranged to be associated with a respective exercise device among said plurality of system devices such that the associated exercise device is located within range of the short-range wireless transmitter in the electronic tag and all other system devices among the plurality of system devices are located beyond the range of the short-range wireless transmitter, and
wherein the identifier of the electronic tag is the device identifier which is unique to the associated exercise device, and
a computer system configured to receive the device identifier from a portable electronic device that has intercepted the data package transmitted by the electronic tag and extracted the device identifier from the data package, and
a relay device which is arranged in the common facility and is configured to receive the workout data and the device identifier from the wireless transmitter and transmit the workout data and the device identifier to the computer system.

2. The data collection system of claim 1, wherein the workout data comprises at least one of a weight being used with the exercise device and a number of repetitions of using of the weight.

3. The data collection system of claim 1, wherein the computer system is configured to, after receiving the device identifier from the portable electronic device and after receiving the workout data and the device identifier transmitted by the wireless transmitter of the exercise device, transmit information related to the workout data to the portable electronic device or to a feedback device associated with the exercise device.

4. A method of operating a portable electronic device, comprising:
receiving a data package from an electronic tag that is configured to detect an object in proximity of the electronic tag, and, upon detection of the object, transmit a data package comprising an identifier of the electronic tag,
extracting the identifier of the electronic tag from the data package,
obtaining inertial data from an inertial sensor in the portable electronic device,
detecting, based on the inertial data, a predefined docking state on the electronic portable device in relation to the electronic tag, and
communicating, upon detection of the predefined docking state, the identifier to a computer system.

5. The method of claim 4, wherein the predefined docking state corresponds to the portable electronic device being brought into contact with the electronic tag.

6. The method of claim 4, further comprising determining a motion of the portable electronic device based on the inertial data, wherein said detecting the predefined docking state comprises detecting that the motion represents an impact of the portable electronic device onto the electronic tag.

7. The method of claim 4, further comprising determining a current orientation of the portable electronic device based on the inertial data, wherein said detecting the predefined docking state comprises detecting that the current orientation matches a predefined orientation.

8. The method of claim 7, wherein the predefined orientation represents a reference plane of the electronic tag, said reference plane being defined in relation to the direction of gravity.

9. A portable electronic device, which is configured to:
receive a data package from an electronic tag that is configured to detect an object in proximity of the electronic tag, and, upon detection of the object, transmit a data package comprising an identifier of the electronic tag,
extract the identifier of the electronic tag from the data package,
process inertial data from an inertial sensor in the portable electronic device to detect a predefined docking state of the portable electronic device in relation to the electronic tag,
communicate, when the predefined docking state is detected, the identifier to a computer system.

10. The portable electronic device of claim 9, wherein the predefined docking state corresponds to the portable electronic device being brought into contact with the electronic tag.

11. The portable electronic device of claim 9, which is configured to determine its motion based on the inertial data, wherein detecting the predefined docking state comprises detecting that the motion represents an impact of the portable electronic device onto the electronic tag.

12. The portable electronic device of claim 9, which is configured to determine its current orientation based on the inertial data, wherein detecting the predefined docking state comprises detecting that the current orientation matches a predefined orientation.

13. The portable electronic device of claim 12, wherein the predefined orientation represents a reference plane of the electronic tag, said reference plane being defined in relation to the direction of gravity.

* * * * *